(12) United States Patent
Milam

(10) Patent No.: US 8,028,889 B2
(45) Date of Patent: Oct. 4, 2011

(54) WELDING TOGETHER LOW AND HIGH CARBON STEELS

(75) Inventor: David L. Milam, North Canton, OH (US)

(73) Assignee: The Timken Company, Canton, OH (US)

( * ) Notice: Subject to any disclaimer, the term of this patent is extended or adjusted under 35 U.S.C. 154(b) by 67 days.

(21) Appl. No.: 12/539,926

(22) Filed: Aug. 12, 2009

(65) Prior Publication Data

US 2009/0302094 A1     Dec. 10, 2009

Related U.S. Application Data

(62) Division of application No. 11/118,311, filed on Apr. 29, 2005, now Pat. No. 7,588,837.

(51) Int. Cl.
   *B23K 26/22*      (2006.01)
(52) U.S. Cl. .............. 228/193; 228/262.41; 219/121.64
(58) Field of Classification Search .................. 228/196, 228/193, 262.41; 219/121.64
   See application file for complete search history.

(56) References Cited

U.S. PATENT DOCUMENTS

| 6,066,828 A | 5/2000 | Mitsuyoshi et al. | |
|---|---|---|---|
| 6,163,011 A | 12/2000 | Urushizaki et al. | |
| 2002/0017554 A1* | 2/2002 | Imai et al. | 228/246 |
| 2004/0069382 A1* | 4/2004 | Yokoi et al. | 148/650 |

FOREIGN PATENT DOCUMENTS

| JP | 11333571 | 12/1999 |
|---|---|---|
| JP | 2001353587 A * | 12/2001 |
| WO | 2004/002673 | 1/2004 |

OTHER PUBLICATIONS

Brandt, H.G. and H. Weiler, "Welding and Cutting," Ullmann's Encyclopedia of Industrial Chemistry, Wiley-VCH Verlag GmbH & Co. KGaA, 2005. pp. 1-27.
Vishnu, P.R., "Solid-State Transformations in Weldments," vol. 6, ASM Handbooks Online, ASM International, 2002. (12 pages total).
Bramfitt, B.L., "Effects of Composition, Processing, and Structure on Properties of Irons and Steels," vol. 20, ASM Handbook, ASM International, 1997. (7 pages total, including front matter).
"Calculation, Measurement, and Simulation of Weld Thermal Cycles," Th.J. van Adrichem and J. Kas, Holectechniek 1 (1971) 2-11.
Welding Handbook, Eighth Edition, vol. 4, Materials and Applications (Part 2), William R. Oates and Alexander M. Saitta, American Welding Society (1998).
International Preliminary Report on Patentability for PCT/US2006/015994; date of completion of report Aug. 8, 2007, 12 pages.

* cited by examiner

*Primary Examiner* — Jessica L Ward
*Assistant Examiner* — Nicholas D'Aniello
(74) *Attorney, Agent, or Firm* — Polster, Lieder, Woodruff & Lucchesi, L.C.

(57) ABSTRACT

A weld joins a thin overlay of low carbon steel to a base that contains high carbon steel, at least at its surface along which the weld is formed. The weld may be effected by fusion (melting) or by solid-state diffusion. With either it creates a heat affected zone (HAZ) in the base around the weld. The HAZ contains enough austenite, and perhaps bainite as well, to render the HAZ relatively ductile and also crack resistant. Adjacent to the weld the HAZ has a hardness that does not exceed 58 HRC. The weld may be produced with a high energy beam or with resistance welding equipment.

9 Claims, 3 Drawing Sheets

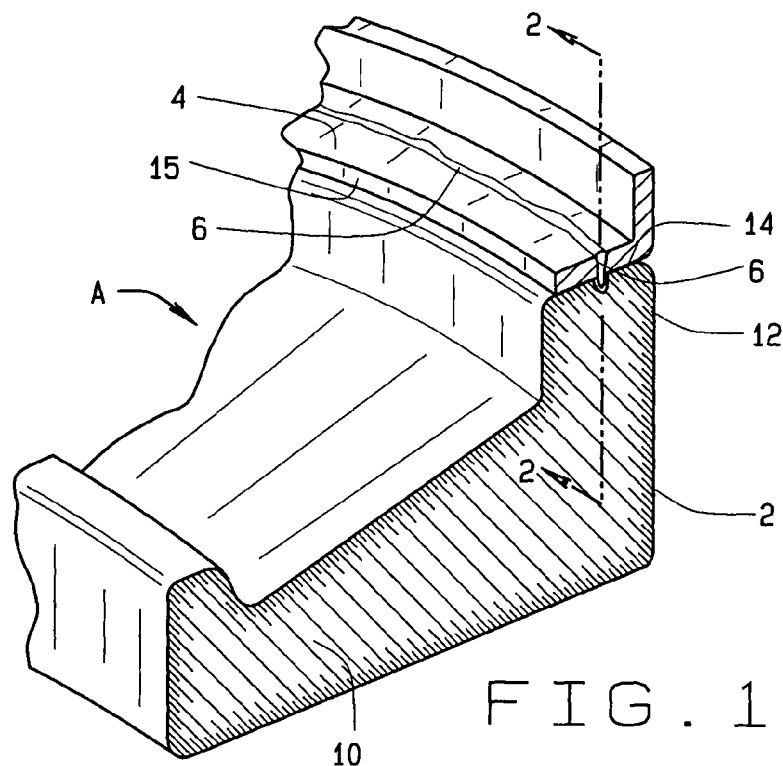
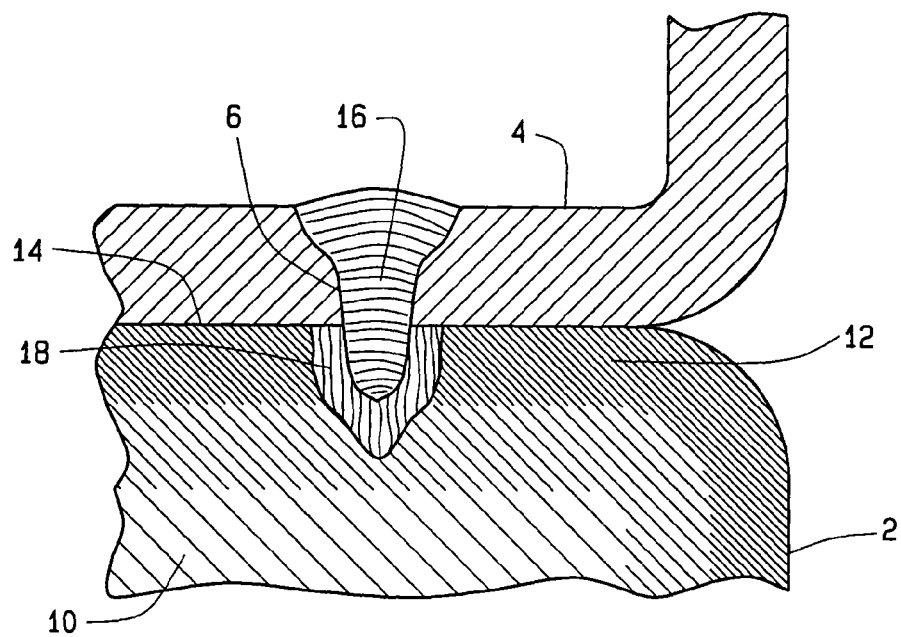

WELDING TOGETHER LOW AND HIGH CARBON STEELS

CROSS-REFERENCE TO RELATED APPLICATIONS

This application is a divisional of U.S. application Ser. No. 11/118,311, filed Apr. 29, 2005, and derives priority from and otherwise claims the benefit of that application.

STATEMENT REGARDING FEDERALLY SPONSORED RESEARCH

Not applicable.

BACKGROUND OF THE INVENTION

This invention relates in general to welding and, more particularly, to a process for welding high and low carbon steels together and to a weldment formed by the process.

If steel is heated above its upper critical temperature, which varies depending on the amount of carbon in the steel, the steel assumes a phase known as austenite, which is a solid solution of iron and carbon. Should the steel undergo a rapid cooling, some of the austenite will transform into martensite, which is extremely hard, while much of the rest will remain as retained austenite, which is considerably softer and more ductile, although other ductile constituents will usually be present as well. The amount of martensite that is formed depends to a large measure on the amount of carbon dissolved in the austenite at the higher temperature. High carbon steels contain harder martensite than low carbon steels. Being harder, high carbon martensite steel resists wear and deformation and is therefore useful in bearings, gears, and products for like applications. But that very same steel lacks ductility, that is to say, it is brittle and tends to crack. Low carbon (ferite, hamite) steel, when quenched, contains low carbon martensite and some Nonmartensitic Transformation Products (NMTP). The low carbon quenched steel is not as brittle, but then it does not resist wear and deformation as well.

A case carburized part, such as a bearing race, possesses the beneficial characteristics of both high and low carbon steel. It has a ductile core that can withstand shocks and a hard case that withstands deformation and wear.

Joining materials by welding can occur either by melting the materials in the vicinity of the joint or by avoiding melting and creating a solid-state diffusion bond. If melting occurs during the welding process, that process is called fusion welding. Consider the situation of fusion welding a component made from two steels. When solidification begins, crystals of austenite form on the unmelted surfaces and grow in size and quantity as solidification progresses. The carbon concentration of the solid must be less than that of the liquid from which it formed, so excess carbon remains in the liquid. The liquid is enriched with carbon. As the temperature continues to decrease, the melted zone becomes mostly solid with a diminishing volume of liquid remaining around the grain.

As the last liquid freezes to solid, that freshly formed solid material shrinks in volume. The solid phase has a smaller volume. The shrinkage creates residual stresses within the fresh solid, know as a melt zone. With continued cooling, most of the higher temperature austenite phase transforms to ferrite, pearlite, bainite, and/or martensite depending upon the carbon concentration and the cooling rate.

The cooling rate can be affected by a heat treatment immediately prior to welding that raises the temperatures of the two components. This elevated temperature causes the cooling rate of the solidified melt zone to be retarded, thereby, allowing NMTP to be formed. The NMTP are resistant to cracking. Microstructures containing large volume fractions of martensite are not resistant to cracking. Thus, the solidified and cooled melt zone does not crack in response to the shrinkage-induced residual stress because of the minimization of martensite formation. Preheating the components is a well-known practice, but preheating may not be possible. Softening of the components, dimensional change, distortion, and/or undesirable scaling and tinting of the surface may render preheating undesirable.

Consider the situation of fusion welding steels without a preheat. The mass of metal in the components functions as a heat sink and rapidly cools the steel in the region of the weld—self quenching in effect—and as a consequence, the steel in the melt zone acquires a good measure of martensite. The solidified cooled melt zone formed during the welding of low carbon steels without a preheat consists of the relatively soft low carbon martensite, some NMTP, and some retained austenite. The melt zone does not crack in response to the shrinkage-induced residual stresses.

Joining of two high carbon steels without a preheat presents a special problem for the welder. The solidified and cooled melt zone of high carbon steel consists of relatively hard high carbon martensite and a lesser amount of retained austenite. This brittle microstructure cracks in response to the shrinkage-induced residual stresses. Cracks within the melt zone caused by shrinkage-induced residual stresses are known as "solidification cracks" and "hot cracks".

The foregoing has focused upon the melt zone. Now, consider the situation of the heat affected zone (HAZ) adjacent to the melt zone. The heat of welding raises its temperature above the upper critical temperature as well. As the HAZ cools, it is also subject to shrinkage-induced residual stresses. However, the material in the HAZ remains cooler and stronger than the hotter melt zone. Cracking of the HAZ does not necessarily accompany solidification. If it occurs, it will occur after a delay ranging from seconds to days.

Fusion welding of two low carbon steels results in a HAZ that is first austenitized and then cooled to form the crack-resistant composite microstructure containing low carbon martensite, NMTP, and some retained austenite. Fusion welding of two high carbon steels results in a heated and cooled HAZ creating the crack-susceptible high carbon martensite and some retained austenite. Thus, the HAZs of high carbon steels are prone to cracking.

Not all weldments contain fusion welds—the welds can be diffusion bonds. An example is friction stir welding. If there is no melting, a melt zone formation and consequent shrinkage stresses fail to develop. Although there is no melt zone, a HAZ is created on both sides of the joint. The HAZ microstructure that develops is dependent upon cooling rate and carbon concentration. In the absence of a preheat, the cooling rate will be fast due to the self-quenching. The HAZ microstructure will always contain martensite because of the rapid quench. The carbon concentration is then the determining factor for HAZ microstructure. Solid state welding of low carbon steels will create crack-resistant microstructures, and crack-susceptible microstructures will be produced in HAZs of high carbon steels.

When a welder fusion welds a low carbon steel to a high carbon steel with no filler metal, a somewhat similar problem develops. Again a melt and a HAZ develop and undergo a self quench. The steel in the melt zone represents a mixture of high and low carbon steels, and as a consequence has a carbon content intermediate that of the two steels. Usually, it is not enough to create hard plate-type martensite, so the melt zone remains relatively ductile. That much of the HAZ that lies with the low carbon steel is not sufficiently brittle to cause concern. However, the remainder of the HAZ, that is the portion that lies within the high carbon steel, acquires considerable plate-type martensite and as a consequence is hard and brittle and subject to cracking under stresses, both residual and applied. The problems with welding high carbon steel, either to more high carbon steel or to a low carbon steel, are particularly acute with butt welding and fillet welding. But they appear in the laser lap seam welding and resistance welding as well.

Typically, the race of an antifriction bearing is formed from a case carburized steel that has undergone a heat treatment to produce a hard surface on the race, or else it is formed from a high carbon steel that is through hardened in a heat treatment. But often a race must be fitted with a shield or some other component, often a stamping formed from low carbon steel. Since welding is not a viable option under current technology, the component is pressed over, snapped into or onto, or in some other way mechanically connected to the race. Welding would serve as a desirable alternative if practical. To be sure, procedures exist for lessening the deleterious results from welding high carbon steel to low carbon steel. One is preheating. However, that softens both steels, perhaps more than desired. Another resides in applying temper pulses to the weld after it is made. These, however, do not produce the desired ductility. Normally, they lower the hardness to no less than about 58 HRC (Rockwell C) when preferably it should be less than 50 HRC. Then again there is traditional tempering, but it is a diffusion process that requires considerable time and still lowers the hardness of the high carbon steel to only about 58 HRC.

BRIEF DESCRIPTION OF THE SEVERAL VIEWS OF THE DRAWINGS

FIG. 1 is a fragmentary perspective view of a weldment forming part of the present invention and made in accordance with the process of the present invention;

FIG. 2 is a sectional view taken along line 2-2 of FIG. 1;

DETAILED DESCRIPTION OF THE INVENTION

Figure 3:
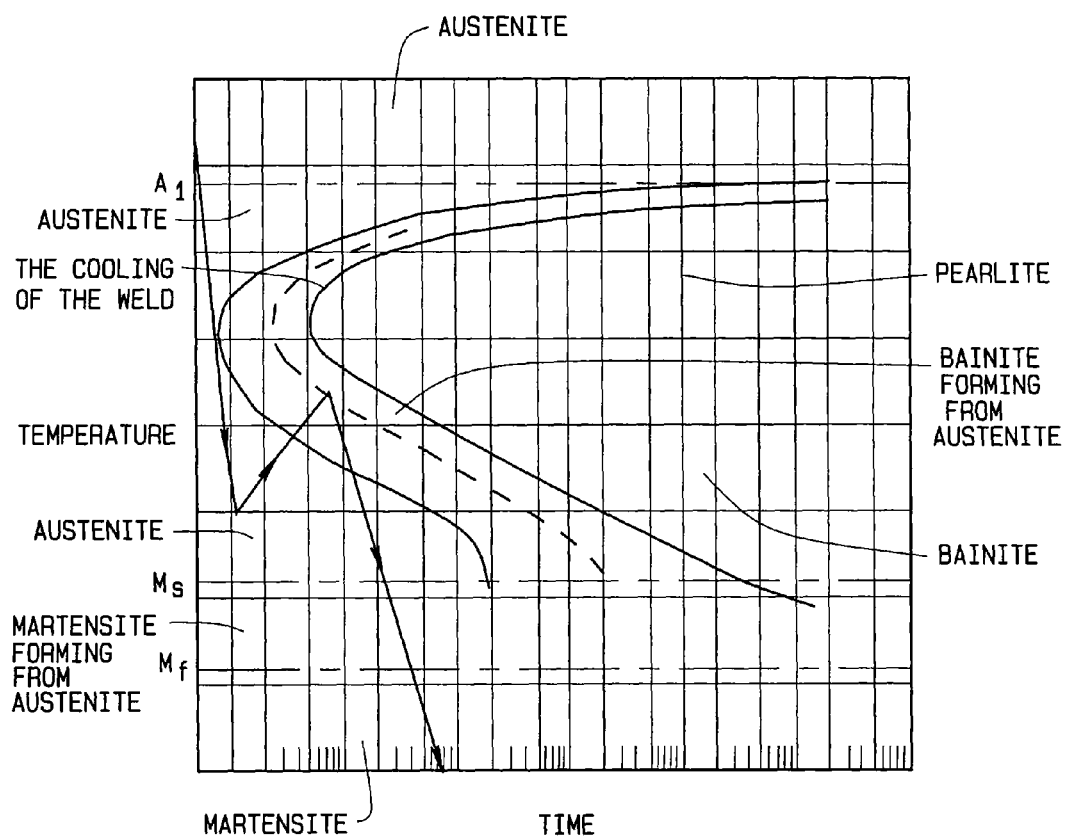
FIG. 3 is a TTT diagram showing the manner in which the weldment, when formed by a two stage process, is cooled.

Referring now to the drawings, a weldment A (FIG. 1) includes two elements in the form of a case carburized base 2 and an overlay 4 which overlies the base 2. In addition, the weldment A contains a lap seam weld 6 which joins the overlay 4 to the base 2, thus firmly attaching those two elements together. The base 2 may take the form of a race for an antifriction bearing, whereas the overlay 4 could be a shield or perhaps a case forming part of a seal for excluding contaminants for the interior of the bearing. At the weld 6, the base 2 possesses considerably greater thickness and mass than the overlay 4. The weld 6 pierces the overlay 4, but not the base 2.

The base 2 (FIGS. 1 & 2) is an integral and unitary structure, but even so it has a core 10 of low carbon steel and a case 12 of high carbon steel. The core 10 constitutes by far the greatest mass of the component 6, the case 12 being quite thin and simply diffusing into the core 10. Indeed, the case 12 extends over and envelopes the core 10. It thus provides an exterior surface 14 on the base 2. The carbon content of the core 10 by weight may range between 0.10% and 0.30%, with the remainder of the core 10 being essentially iron. The carbon content of the case 12 at the surface 14 may range between 0.7% and 1.3% by weight. Having undergone a heat treatment, the case 12 is quite hard. Indeed, its hardness may range between 58 and 64 HRC.

The overlay 4 is quite thin, it having thickness between about 0.030 and 0.200 inches. It overlies the surface 14 on the hard case 12 of the base 2, with the overlap equaling at least the width of the weld 6. The overlay 4 is formed from a low carbon steel containing between 0.09% and 0.20% by weight carbon. More often than not, the overlay 4 is formed from steel sheet, no thicker than about 0.200 in. and preferably 0.059 to 0.135 inches. It has a margin or edge 15.

The lap seam weld 6 pierces the overlay 4 and penetrates the case 12 on the base 2, thus attaching the low carbon overlay 4 to the base 2 at the high carbon case 12 on the base 2. Within itself, the weld 6 is continuous and thus is considerably longer than it is wide. It is set inwardly from the edge 15. It creates (FIG. 2) a melt zone 16—actually, a zone of formerly molten metal—that extends through the overlay 4 and into the case 12 and perhaps beyond into the core 10 of the base 2. The steel in the melt zone 16 is steel derived solely from the overlay 4 and base 2. No filler metal is added. The weld 6 also creates a heat affected zone (HAZ) 18 that generally envelopes that much of melt zone 16 that lies at least within the base 2, particularly the portion of the base 2 that is occupied by the case 12. Its constituency is also steel, indeed that of steel with a carbon content of the case 12 or core 10 at whatever depth one considers the HAZ 18. To be sure, the HAZ 18 may not have the same hardness as that of the remainder of the case 12 or the core 10, but at least its carbon content is the same.

When the base 2 is made of carburized steel (FIG. 2), the weld 6 is formed in a single pass with a high energy beam that is focused on the overlay 4 at the location where the overlay 4 is to be attached to the underlying base 2. Preferably, the beam is produced by a laser, although other high energy beams will suffice as well. The high energy beam is powerful enough to melt the steel of the overlay 4 and the steel of the underlying base 2 at the localized area where it is focused. It produces the melt zone 16 and the HAZ 18.

The high energy beam elevates the temperature of the weldment A at the location where it is focused high enough to melt the low carbon steel of the overlay 4 and the high carbon steel of the case 10 on the base 2. The molten steel, upon cooling and solidifying, becomes the melt zone 16. The high energy beam also elevates the temperature of the surrounding steel in the case 12 above the upper critical temperature for the high carbon steel, but not hot enough to actually melt that steel. The heat transforms the surrounding steel into a solid solution of austenite, and thus forms the HAZ 18. As the high energy beam moves on, the molten steel rapidly cools, its heat being dissipated quickly into the remaining regions of the base 2 and to a lesser measure into the overlay 4. In effect, the melt zone 16 and the HAZ 18 undergo a self quench.

To prevent a high hardness, mostly martensite structure from developing within the HAZ 18 of the carburized steel for the base 2, the power of the high-energy beam exceeds that which would be required just to penetrate into the high carbon steel case 12. Indeed, the power of the beam is sufficient to raise the temperature of the HAZ 18 near the boundary interface between the melt zone 16 and the HAZ 18 to at least 1750° F. The consequence of raising the temperature of the HAZ 18 to at least this magnitude is to dissolve the available carbon in the austenite. After the high energy beam advances, the austenite in the HAZ 18 near the interface cools through the $M_s$ temperature, its heat being dissipated into mass of the base 2. Owing to the increased carbon dissolved in solution, the austenite in the HAZ 18 transforms into a composite structure of largely martensite and retained austenite. The austenite volume fraction is now 30%-50%. In any event, the magnitude of retained austenite in the HAZ 18 near the interface is significantly greater than that existing outside the HAZ 18 in the high carbon case 10. This leaves the HAZ 18 near the interface with a hardness not exceeding 56-58 HRC. The relatively high volume fraction of retained austenite is sufficiently ductile to prevent crack formation.

Deeper within the HAZ 18, farther from the area raised to greater than 1750° F., the microstructure consists of a lesser amount of retained austenite and more martensite. But cracks do not form here for two reasons: (1) the state of residual stress is considerably less away from the interface, and (2) the martensite contains lower carbon, lath-type martensite that is free of microcracks and is less brittle.

Were the temperature of the melt zone 16 and the HAZ 18 to drop rapidly through the $M_s$ temperature without dissolving the available carbon in the austenite, martensite would begin to form, with the greatest concentration being in the HAZ 18, because it possesses the highest content of carbon. Indeed, the martensite in the HAZ 18 would leave the HAZ 18 with a hardness as high as 63-64 HRC. Owing to the brittleness and high residual stresses which accompany high hardness, fracturing would likely occur along the boundary between the melt zone 16 and the HAZ 18.

Where the base 2 is homogenous in the sense that it is formed entirely from high carbon steel and through hardened, the weld 6 is formed in two or more passes. The first pass possesses considerably more intensity than the subsequent pass or passes. The second pass serves to interrupt the cooling of the melt zone 16 and the HAZ 18. The second pass follows the first pass in a matter of 3 to 5 seconds. That is to say, once the high energy beam in its advance leaves a specific point, the same or another high energy beam in the second pass should visit the same point in a matter of seconds. In any event, the temperature of the high carbon steel within the HAZ 18 after the first pass should remain above the $M_s$ temperature so that between the first and second passes at any point along the weld 6, the steel in the HAZ 18 remains as essentially austenite. During the second pass, the temperature of the steel again rises, but not as high as during the first pass and less than the eutectoid temperature. Some, but not all of the steel, melts within the melt zone 16 but not in the HAZ 18. The steel in the HAZ 18 remains long enough above the $M_s$ temperature to transform some of the austenite into bainite, which is relatively soft in comparison to martensite. The high energy beam moves on, allowing the steel of the melt zone 16 and the HAZ 18 to again cool, with the heat dissipating into the mass of the base 2 and overlay 4. The steel cools below the $M_s$ temperature where some of the austenite transforms into martensite, but not nearly as much as if the steel were allowed to cool to ambient temperature after the first pass. Indeed, less austenite is present to make the transformation. In any event, the steel of the high carbon HAZ 18, upon further cooling below the $M_s$ temperature to ambient temperature, contains bainite, martensite, and some retained austenite, with the bainite amounting to at least 10% by volume fraction and preferably about 35%. The bainite and austenite are relatively soft and their presence along with the harder martensite leaves the HAZ 18 with a hardness at the interface of preferably 46-50 HRC and, in any event, less than 55 HRC. The melt zone 16 is even softer. As a consequence, residual stresses are reduced and fractures are less likely to develop along the boundary between the melt zone 16 and the HAZ 18. The initial cooling followed by the heating to interrupt the cooling followed by the second cooling may be demonstrated in a TTT diagram specific to the steel of the case 12, particularly the steel at the surface 14 (FIG. 3). This procedure is also suitable for use with a case carburized base 2.

The overlay 4 may be attached to the base 2 with one or more resistance projection welds 26 (FIG. 5), each of which is free of fractures and otherwise characterized by relatively soft steel, not only in the weld 26 itself, but in the region surrounding the weld 26. The base 2 can be made of either carburized steel or high carbon through-hardened steel. The process can be applied to both. Each projection weld 26 may include a melt zone 28 which resides between and within the overlay 4 and the base 2, but pierces neither. Avoidance of a melt zone 28 is sometimes desired. Indeed, the melt zone 28 may be replaced by a pressure bond formed at an elevated temperature with the pressure and temperature being such that solid state diffusion occurs. The lower temperature and heat of the process minimizes distortion. Even so, within the case 12 of the base 2 the weld 26 establishes a HAZ 30. In contrast to the lap seam weld 6 which is continuous or at least considerably longer than it is wide, the projection weld 26 is generally circular and confined to a small spot.

Figure 4:
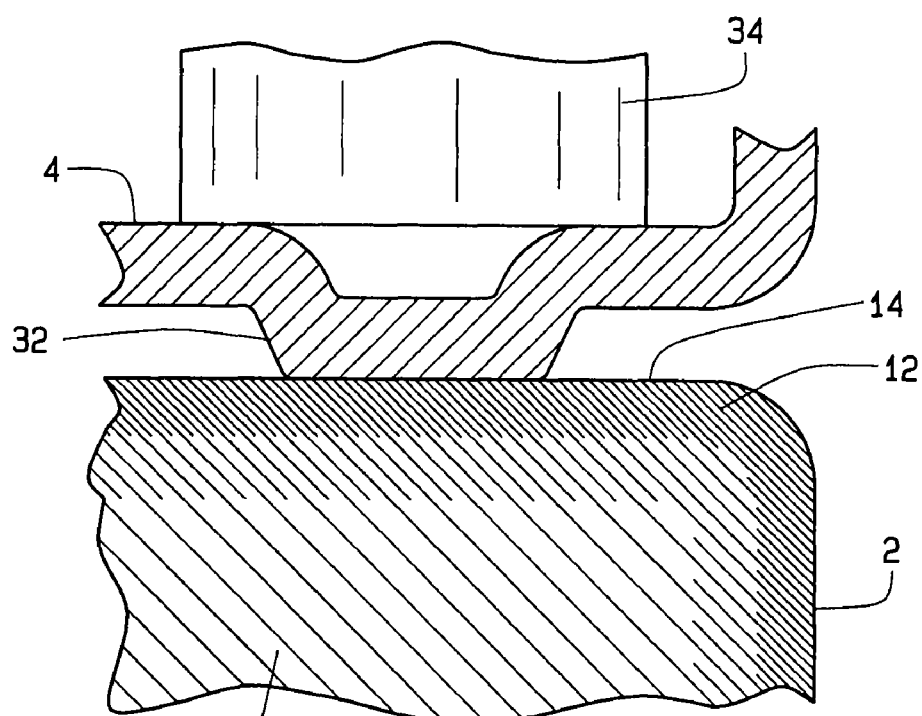
FIG. 4 is a fragmentary sectional view showing high and low carbon steel elements before they are joined together by resistance projection welding.
Figure 5:
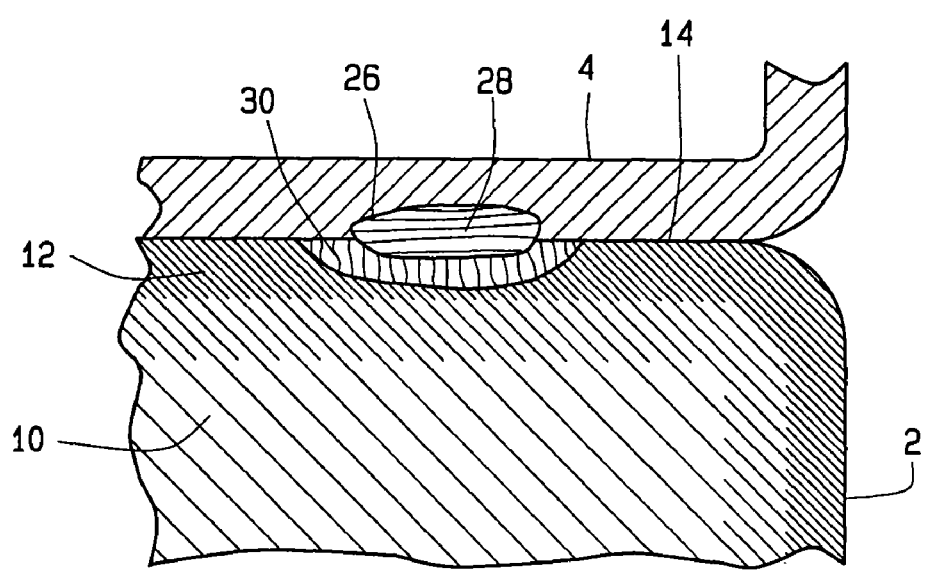
FIG. 5 is a sectional view of a resistance projection weld formed in accordance with the present invention.

To form the projection weld 26, the overlay 4 is placed over a die and struck with a punch to impart an indentation to it on one face at the location where it is to be attached to the base 2 and a detent or projection 32 on its opposite face (FIG. 4). Once the projection 32 is formed, the overlay 4 is placed over the base 2 in the location at which it is to be secured, with the projection 32 being against the exterior surface 14 on the base 2. Indeed, the overlay 4 is forced firmly against the base 2 with an electrode 34 that bears against the overlay 4 around the indentation that is behind the projection 32. With the projection 32 bearing tightly against the surface 14 of the base 2, the electrode 34 along with the overlay 4 against which it bears and base 2 are placed across a source of electrical energy. It generates a current which passes through the projection 32 and heats the projection 32 high enough to cause the overlay 4 to bond to the base 2 at the projection 32, either by fusion (melting) or solid state diffusion. If the magnitude of the current is such that it melts the projection 32, the projection 32 disappears and the overlay 4 seats against the surface 14 on the base 2 (FIG. 5). Not only does the current melt the projection 32, but it also melts the base 2 where the projection 32 bore against it. In short, the current produces a melt zone 28 which lies within the overlay 4 and also within the base 2. In addition, the current creates the HAZ 30 around and beneath that much of the molten zone 28 that exists within the base 2. On the other hand, where the current produces a solid state diffusion, a HAZ 30 still develops.

If in the case of a fusion bond the melt zone 28 and HAZ 30 were allowed to cool to ambient temperature at this juncture, the melt zone 28 would acquire some martensite, but not enough to make it excessively hard and brittle. After all, it possesses a carbon content somewhere between the low carbon content of the overlay 4 and the high carbon content of the case 12 on the base 2. But the HAZ 30, as a consequence of the rapid dissipation of heat into the mass of the base 2, undergoes a precipitous drop in temperature. Much of the austenite would transform into martensite if the HAZ 30 were allowed to cool below the $M_s$ temperature, and this would leave the HAZ 30 extremely hard and brittle. The same holds true for a solid state diffusion.

But the projection weld 26, like the lap seam weld 6 for a high carbon through hardened base 2 is formed in a two-step process. The first step creates the melt zone 28 or at least a solid state diffusion bond and the HAZ 30. The second step, consisting of one or more applications of electrical potentials reheats both. More specifically, before the steel in the HAZ 30 cools to the $M_s$ temperature it is reheated at least once by placing the weld 26 across an electrical potential and directing current through it. The one or more reheats elevates the temperature of the HAZ 30, but not enough to reach the eutectoid temperature. Indeed, these later applications of current produce enough heat and are long enough to transform some of the austenite in the HAZ 30 into bainite. Once the electrical potential is finally removed, the HAZ 30 and melt zone 28 or diffusion bond cool to ambient temperature, with most of the cooling occurring by the dissipation of heat into the mass of the base 2—in effect, a self quench. As the temperature drops through the $M_s$ temperature and approaches the $M_f$ temperature, some of the austenite transforms into martensite. However, the martensite is considerably less than it would have been had the cooling after the initial formation of the weld 26 not been interrupted.

Basically, the same two-step procedure that is used for joining the overlay 4 to the base 2, whether the latter be case carburized or through hardened, may be used to join the overlay 4 to the base by resistance spot welding or by resistance seam welding. In both the weld occurs in the absence of a projection 32.

Irrespective of whether the overlay 4 and base 2 are joined with the lap seam weld 6 or a resistance weld 26, the weld 6 or 26 that is formed contains less martensite and more austenite and perhaps bainite than those produced by traditional procedures for welding low carbon steel to high carbon steel. And this holds true whether the base 2 be case carburized or through hardened. The welding creates a bond between the low carbon steel and the high carbon steel, and that bond may be a fusion bond produced by melting the two steels or it may be a solid state diffusion bond. Irrespective of the type of welding, the welding elevates the temperature of the overlay 4 and base 2 and produces a heat affected zone (HAZ), and the HAZ, while containing martensite, also at the weld contains enough austenite and may also contain bainite—all in sufficient quantities to produce a hardness at that location not exceeding preferably 55 HRC and certainly not 58 HRC and to otherwise render the HAZ crack resistant.

In the context of the welding processes, low carbon steel has a carbon content of no more than about 0.30% by weight, whereas high carbon steel has a carbon content of not less than about 0.60% by weight.

The invention claimed is:

1. A process for welding first and second steel elements together, the first element being formed from a low carbon steel and the second element containing, at a surface thereon, a high carbon steel, said process comprising:

placing the two elements together, with the first element being against the surface of high carbon steel on the second element;

heating the elements in a localized area where they are together to effect a bond between the steels of the two elements in that area, the heating further transforming the nearby high carbon steel in the second element into a heat affected zone (HAZ) in which the high carbon steel is austenitic;

allowing the steel in the HAZ to cool yet remain austenitic and above the martensite start temperature;

while the steel in the HAZ remains austenitic, subjecting the localized area to further heating that elevates the temperature of the HAZ to less than the eutectoid temperature and to further cooling such that some of the steel in the HAZ transforms from austenite to bainite; and thereafter allowing the steel in the HAZ to cool below the martensite start temperature for the steel in the HAZ, whereby the steel in the HAZ includes bainite in addition to martensite, with the bainite being at least 10% by volume fraction.

2. The process according to claim 1 wherein the steels in the localized area are allowed to cool by dissipating heat into the first and second elements beyond the localized area.

3. The process according to claim 1 wherein heating the elements occurs in at least two successive stages, with the first heating stage rendering the steel in the HAZ austenitic; and wherein allowing the elements to cool occurs in at least two successive stages, with the first of the cooling stages being between the first and second heating stages.

4. The process according to claim 1 wherein the HAZ after the last cooling stage contains about 35% bainite by volume fraction.

5. The process according to claim 1 wherein the second element has a carburized case and the surface of high carbon steel on the second element is on the carburized case.

6. The process according to claim 1 wherein heating the elements in the localized area melts the steel of the two elements at the localized area to create a melt zone that is surrounded by the HAZ.

7. The process according to claim 1 wherein the heating of the elements to melt the steels includes subjecting the two elements to a high energy beam where the elements are together.

8. The process according to claim 1 wherein the heating of the elements to melt the steels includes conducting an electrical current through the elements where the first element is against the second element.

9. The process according to claim 1 wherein the carbon content of the low carbon steel does not exceed about 0.30% by weight and the carbon content of the high carbon steel is at least 0.60% by weight; and wherein the hardness of the HAZ does not exceed 58 HRC.

* * * * *